United States Patent [19]
Mitchell

[11] Patent Number: 5,150,363
[45] Date of Patent: Sep. 22, 1992

[54] SERIAL INPUT/OUTPUT MULTIPLEXING APPARATUS

[75] Inventor: Michael L. Mitchell, Terre Haute, Ind.

[73] Assignee: Digital Audio Disc Corporation, Terre Haute, Ind.

[21] Appl. No.: 392,417

[22] Filed: Aug. 11, 1989

[51] Int. Cl.⁵ .......................... H04J 3/04; H04L 5/16; H04B 3/20
[52] U.S. Cl. ...................................... 370/112; 370/31
[58] Field of Search .................. 370/24, 31, 112, 85.8, 370/95.2; 340/825.06, 825.07, 825.08, 825.32, 825.36, 825.44, 825.52

[56] References Cited

U.S. PATENT DOCUMENTS

| | | | |
|---|---|---|---|
| 4,160,877 | 7/1979 | Vander Mey | 370/112 |
| 4,310,922 | 1/1982 | Lichtenberger et al. | 370/112 |
| 4,897,831 | 1/1990 | Negi et al. | 370/31 |
| 4,893,305 | 1/1990 | Fernandez et al. | 370/31 |

Primary Examiner—Douglas W. Olms
Assistant Examiner—Wellington Chin
Attorney, Agent, or Firm—Alvin Sinderbrand; William S. Frommer

[57] ABSTRACT

Serial input/output multiplexing apparatus for bi-directional communication of input status signals and output control signals between remote devices and a programmable logic controller (P.L.C.) over a two-wire, asynchronous communication channel. A remote module includes an input interface circuit to receive input status signals from each of plural input devices, an output interface circuit for transmitting output control signals to each of plural output devices, and a controller for selectively coupling the input interface circuit or the output interface circuit to the two-wire asynchronous communication channel for transmitting serial status information to the communication channel or for supplying to the output interface circuit output control information serially received from the communication channel. A local module includes a local output interface circuit for applying the status information to the P.L.C., a local input interface circuit for receiving control information from the P.L.C. and a controller for selectively coupling the local output or input interface circuits to the communication channel for receiving status information or transmitting control information.

17 Claims, 1 Drawing Sheet

SERIAL INPUT/OUTPUT MULTIPLEXING APPARATUS

BACKGROUND OF THE INVENTION

1. Field of the Invention

This invention relates to serial input/output multiplexing apparatus which bi-directionally communicates status and control signals between several remote devices and a programmable logic controller (P.L.C.) over a two-wire asynchronous communication channel and, more particularly, to such apparatus which permits a P.L.C. to control the operation of several remote devices.

2. Description of the Prior Art

In process control techniques, such as used in manufacturing, machine control, telemetry, and the like, a central controller is used to supply control signals to several controllable elements in response to information pertaining to the operation of such elements. In a typical application, a programmable logic controller (P.L.C.) receives status information from remote sensors and produces control information in response thereto which is transmitted to controllable elements. Status information represents two-state information normally monitored in conventional process control. The control information likewise represents two-state conditions of those variables which are controlled in order to regulate the process, or processes, which are carried out. Frequently, the remote sensors and/or the controllable elements are movable with respect to the P.L.C. Heretofore, a separate set of wires extends from each remotely disposed sensor to the P.L.C., and yet another set of wires extends from the P.L.C. to each controllable element.

When separate sets of wires extend between remote devices, whose status are monitored and whose functions are controlled, and the P.L.C., care must be used in wiring the remote devices to the P.L.C. This requires technical skill and is quite time-consuming and laborious. For example, two or three wires must be routed in bundles or wire raceways between each remote device and the P.L.C. In addition to this obvious drawback, the relative movement between the remote devices and the P.L.C., as aforesaid, requires movable assemblies or systems and often is accompanied by fatigue of the wires themselves. As a result, faults in the wire communication channels may occur and this interferes with accurate monitoring and control of the remote devices. Wire faults must, of course, be repaired; and this results in unacceptable "downtime" of the controlled process.

It has been proposed to provide a multiplexing arrangement between a central station and several remote, monitored devices. Typically, however, proposals of this nature are directed to alarm and security systems, whereby signals produced by remote sensors are received at the central station. One example of such a system is manufactured by Ritron, Inc. of Carmel, Ind., under the name "TELESWITCH". This system is a radio telemetry system which transmits up to sixteen contact closures sensed at a remote location to a central station via a radio link over which a digital message is transmitted. It is believed that this TELESWITCH system is not capable of sending control signals back to the remote locations from the central station. Hence, this system appears to be simply a monitoring arrangement.

Another proposed multiplexing system for transmitting monitored information from remote locations to a central station has been suggested by Measurement Technology Ltd., Luton, England, known as System MTL 820. In this switch multiplexer system, the status of up to sixteen remotely located switches or proximity detectors is transferred to a serial bit-stream and transmitted by a single two-core cable to a receiver at the central station. Information from each monitored switch is sampled periodically and then multiplexed onto a single data highway. The System MTL 820 suffers from the same disadvantage discussed above: namely, there is no suggestion or apparent ability to transmit control information from the central station back to any of the remote devices. Moreover, the operating speed of these previous proposals is too slow for many applications wherein sensor information must be updated periodically and quickly to achieve precise control over the conditions being monitored.

OBJECTS AND SUMMARY OF THE INVENTION

Therefore, it is an object of the present invention to provide serial input/output multiplexing apparatus which enables status information from remote devices to be transmitted quickly to a programmable logic controller (P.L.C.) and also permits control signals to be sent back to those devices from the P.L.C.

Another object of this invention is to provide input/output multiplexing apparatus which operates at speeds greater than those heretofore found in previous multiplexing proposals.

A further object of this invention is to communicate bi-directionally between a P.L.C. and several remote devices by transmitting digital signals over a two-wire asynchronous communication channel.

Various other objects, advantages and features of the present invention will become readily apparent to those of ordinary skill in the art and the novel features will be particularly pointed out in the appended claims.

In accordance with this invention, serial input/output multiplexing apparatus is provided for bi-directional communication of input status signals and output control signals between remote devices and a programmable logical controller (P.L.C.) over a two-wire asynchronous communication channel. A remote module includes an input interface circuit for receiving input status signals from each of plural input devices coupled thereto, an output interface circuit for transmitting output control signals to each of plural output devices coupled thereto, and a controller for selectively coupling the input interface circuit or the output interface circuit to the two-wire asynchronous communication channel. A local module includes an output interface circuit for applying to the P.L.C. status information received from the remote module, a local input interface circuit for receiving control information from the P.L.C., and a controller for selectively coupling the local output interface circuit or the local input interface circuit to the two-wire asynchronous communication channel for applying to the P.L.C. input status information serially received from the remote module or for supplying serial output control information produced by the P.L.C. to the remote module.

It is a feature of this invention to include a parallel-to-serial converter at the remote module for converting parallel input status bits received from the input devices to serial form for transmission over the communication channel. The remote module also includes a serial-to-parallel converter for converting serially received control bits to parallel form for application to the remote output devices. Similarly, the local module includes a serial-to-parallel converter for converting the serially received status information to parallel form for application to the P.L.C., and also a parallel-to-serial converter for converting parallel control information produced by the P.L.C. to serial form for transmission back to the remote module.

As an aspect of this invention, the remote module includes a storage device for storing each status byte produce by the input interface circuit in response to status information supplied thereto from the remote input devices. Successive bytes are read from the storage device to the parallel-to-serial converter for conversion and transmission to the local module. Advantageously, the local module includes individual output interface circuits, each adapted to supply to the P.L.C. a status byte that has been serially received from the remote module and converted back to parallel form by the local serial-to-parallel converter. Thus, the apparatus of the present invention may be used efficiently with several remote devices because there is no substantial delay between the application of successive status bytes to the P.L.C.

As another feature of this invention, the local and remote controllers cooperate to place the local module in a transmit mode while placing the remote module in a receive mode; and after a control byte is received from the local module, the transmit and receive modes are reversed to enable the remote module to transmit status bytes to the local module. Each module thus alternates between a receive and a transmit mode to facilitate rapid communication of status and control bytes therebetween.

BRIEF DESCRIPTION OF THE DRAWINGS

The following detailed description, given by way of example and not intended to be limited solely to the embodiment described herein, will best be understood in conjunction with the accompanying drawing in which:

The FIGURE shows a block diagram of a preferred embodiment of the present invention.

DETAILED DESCRIPTION OF A PREFERRED EMBODIMENT

Remote Module

Figure 1:
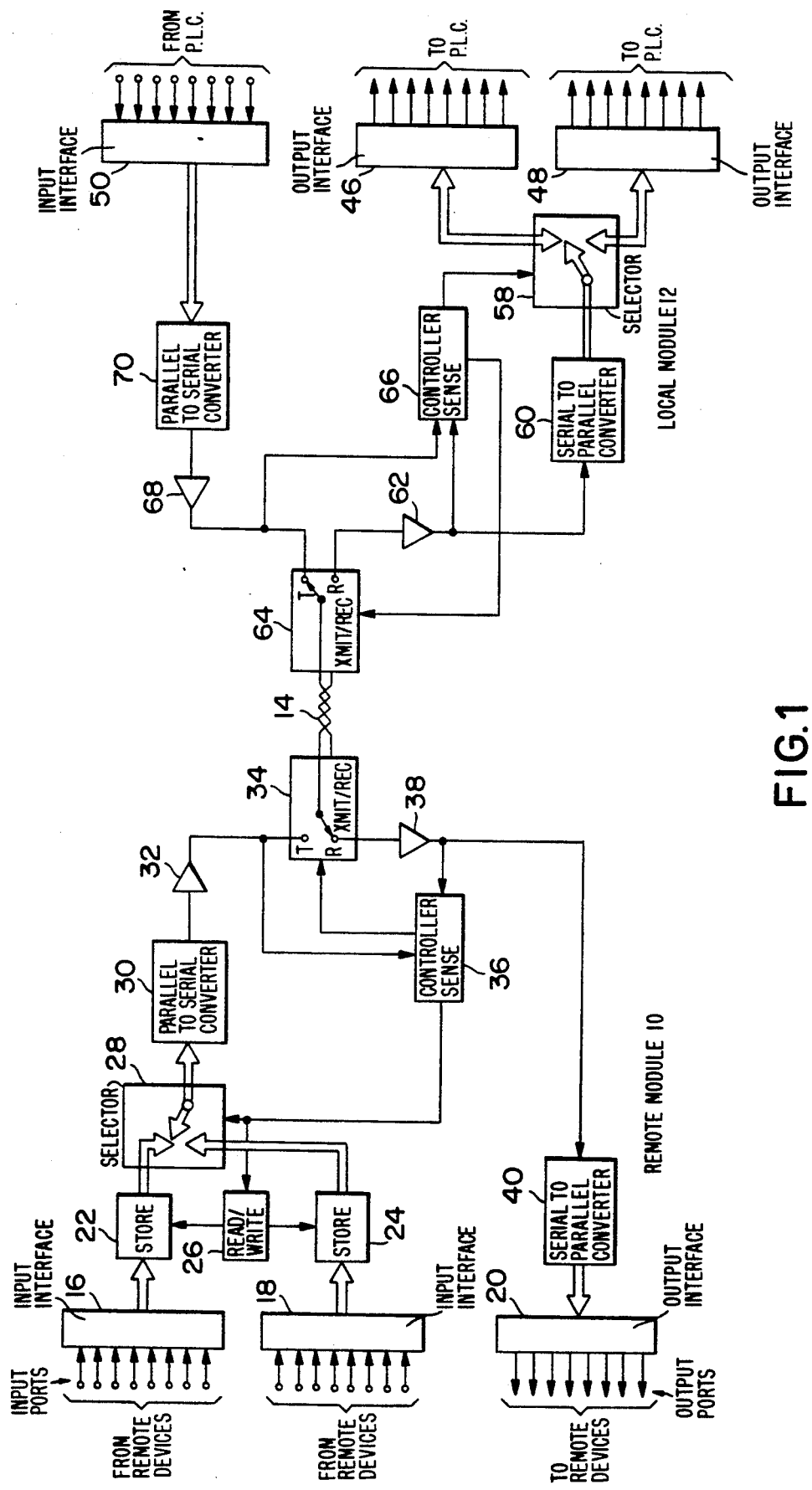

Referring now to the drawings, input/output (I/O) serial multiplexing apparatus is illustrated with a remote module 10 coupled to a local module 12 by way of a two-wire asynchronous communication channel 14. Remote module 10 includes input interface circuits 16 and 18, storage devices 22 and 24, storage selector 28, parallel-to-serial converter 30 and transmit/receive selector 34. The remote module also includes a controller 36, serial-to-parallel converter 40 and an output interface circuit 20.

As illustrated, input interface circuits 16 and 18 are provided with several input ports, each port being coupled to a respective remote device (or sensor) to receive status information therefrom. In the preferred embodiment, each input interface circuit includes eight input ports and, thus, sixteen bits of status information may be coupled to the input interface circuits. Typically, a status bit represents a two-state condition, such as on/off, high/low, hot/cold, etc. In the embodiment disclosed herein, each remote device or sensor applies a status bit to the input port coupled thereto. In an alternative embodiment, each input device supplies a full digital word, or byte, to that input port. In a still further embodiment, analog information is supplied by the remote device; and such analog information then is converted to digital form, as by a conventional A/D converter, for application to the input port. In the interest of simplification, the present discussion assumes that each input port is supplied merely with a status bit.

Input interface circuits 16 and 18 are coupled to storage devices 22 and 24, respectively. In the preferred embodiment, the storage devices are formed as a random access memory (RAM) coupled to a read/write circuit 26 for controlling the locations into which status information is written from the respective input interface circuits and those locations from which stored status information is read. If it is assumed that each input interface circuit includes eight input ports, the eight status bits supplied to the input interface circuit are supplied in parallel to the RAM. The input interface circuit formats a respective status bit received from the input devices coupled thereto into an input status byte for storage in the RAM. For example, the remote devices may be arbitrarily designated device #1, device #2, ... device #8; and bit position #1 of the status byte is formed of the status bit received from device #1, bit position #2 of the status byte is formed of the status bit received from device #2, and so on. It is appreciated that successive status bytes produced by input interface circuits 16 and 18 are stored in individual storage locations of the RAM. For the arrangement shown in the FIGURE, the status byte produced by input interface circuit 16 is stored in storage device 22 and the status byte produced by input interface circuit 18 is stored in storage device 24. Each of the illustrated storage devices may exhibit a capacity sufficient to store several status bytes which, as will be described, are read out in response to read/write circuit 26 which responds to controller 36.

Storage devices 22 and 24 (or the RAM which may be used as the storage devices) are coupled to storage selector 28. Preferably, the data bus between each storage device and the storage selector is comprised of multiple conductors such that a byte may be supplied in parallel to the selector. Controller 36 is coupled to storage selector 28 and selects the particular storage device 22 or 24 from which a status byte is read. As shown, read/write circuit 26 also is coupled to controller 36 and functions to select the particular storage device from which a status byte is to be read and into which a status byte is to be written. For example, the read/write circuit may select the particular location in RAM from which a stored status byte is read or written. It is appreciated that read/write circuit 26 and storage selector 28 may be implemented by conventional hardware.

Storage selector 28 is coupled to parallel-to-serial converter 30 and is adapted to supply a status byte in parallel to the converter. Parallel-to-serial converter 30 functions in a known manner to convert the parallel bits of the status byte supplied thereto into serial form. The output of the parallel-to-serial converter is coupled to a transmit terminal T of transmit/receive selector 34 by way of an output driver 32. Output driver 32 also is coupled to controller 36 to supply the controller with an indication that a status byte has been transmitted to transmit/receive selector 34. The controller, in turn, is coupled to selector 34 to determine whether the transmit terminal T or the receive terminal R of the selector is to be coupled to two-wire asynchronous communication channel 14. For convenience and simplification, storage selector 28 and transmit/receive selector 34 are illustrated as switching devices. It is recognized that these devices may comprise conventional digital switching elements, such as multiplexing devices, or the like.

Serial-to-parallel converter 40 is coupled to the receive terminal R of transmit/receive selector 34 by way of an input driver 38. The serial-to-parallel converter is adapted to convert a serial bit stream supplied thereto from the transmit/receive selector to parallel form. As a result, serial-to-parallel converter 40 applies a control byte to output interface circuit 20. This output interface circuit includes a plurality of output ports coupled to respective ones of remote devices whose operations are controlled in response to the control bits supplied thereto. For example, if it is assumed that a control byte received from transmit/receive selector 34 is comprised of bit #1, bit #2, ... bit #8, then bit #1 of this control byte is supplied to output port #1 of output interface circuit 20, bit #2 is supplied to output port #2, ... and bit #8 is supplied to output port #8. Thus, it is seen that each control bit is applied from its respective output port to the individual remote device connected thereto. Since each control bit is a two-state information indication, the control bit may command the remote device to which it is supplied to carry out one of two opposite functions, such as start/stop, on/off, up/down, etc.

The remote devices coupled to output interface circuit 20 need not be the same devices which are coupled to input interface circuits 16 and 18. For example, and as mentioned above, input interface circuits 16, 18 may be coupled to sensors which sense the operation of a process or operation being controlled, whereas output interface circuit 20 may be coupled to particular devices which act to control the process whose operating characteristics are sensed. Although the number of devices or sensors coupled to the input interface circuits is illustrated as being twice the number of devices coupled to the output interface circuit, it will be recognized that an equal number of input and output devices may be provided. Furthermore, although 8-bit bytes are preferred for both status and control bytes, any other number of bits may be used to constitute a word or character representing status or control information. The specific number of bits used in such status or control information, the number of input or output ports coupled to the input and output interface circuits and the number of such interface circuits which are used form no part of the present invention per se. However, since interface circuits generally are commercially available with eight ports, the use of two input interface circuits is preferred so that up to sixteen bits of status information may be provided.

Local Module

Local module 12 is of similar construction to remote module 10 and may be through of as a mirror image of the remote module. As illustrated, the local module includes output interface circuits 46 and 48, an input interface circuit 50, serial-to-parallel converter 60, transmit/receive selector 64, controller 66 and parallel-to-serial converter 70. Output interface circuits 46 and 48 include output ports coupled to the programmable logic controller P.L.C. (not shown). For convenience, the local module includes the same number of output interface circuits as there are input interface circuits in the remote module. Thus, successive status bytes which are derived from the remote module input interface circuits are supplied alternately to the local module output interface circuits and, thence, to the P.L.C. In the illustrated embodiment, output interface circuits 46 and 48 are each provided with eight output ports coupled to corresponding data input ports of the P.L.C. to supply status information from the remote devices.

Output interface circuits 46 and 48 of local module 12 are coupled to interface selector 58 which may be similar to aforedescribed storage selector 28 of remote module 10. The interface selector included in the local module is controlled by controller 66 to supply status bytes alternately to output interface circuits 46 and 48. In this regard, serial-to-parallel converter 60 converts to parallel form serial status bits received from transmit/receive selector 64 via an input driver 62 coupled to a receive terminal R of the transmit/receive selector 64. For example, successive blocks of eight bits received from communication channel 14 are assembled into 8-bit bytes, and each assembled status byte is coupled to output interface circuit 46 or to output interface circuit 48 by interface selector 58 under the control of controller 66.

Controller 66 is coupled to input driver 62 to sense when a status byte has been received from the two-wire asynchronous communication channel. The controller is coupled to transmit/receive selector 64 to condition this selector either to receive serial status bits from two-wire asynchronous communication channel 14 or to supply serial control bits thereto. In accordance with the preferred protocol established herein, after two status bytes are received at local module 12, for example, after sixteen status bits have been detected, controller 66 changes over the operating mode of transmit/receive selector 64 for the transmission of control bits to the two-wire asynchronous communication channel. After one control byte has been transmitted, for example, after eight control bits have been sent, controller 66 changes over the operation of transmit/receive selector 64 to enable status bits to be received by the local module.

Input interface circuit 50 includes a plurality of input ports coupled to the P.L.C. to receive a control byte therefrom. In the example described herein, bit #1 of the control byte is destined for remote device #1, bit #2 of the control byte is destined for remote device #2, and so on. Input interface circuit 50 is coupled to transmit/receive selector 64 by way of parallel-to-serial converter 70 and output driver 68. It is recognized that this parallel-to-serial converter serializes the bits supplied in parallel thereto from input interface circuit 50; and these serial control bits are transmitted over two-wire asynchronous communication channel 14 by transmit/receive selector 64. Output driver 68 also is coupled to controller 66 to enable the controller to sense when a control byte has been serially transmitted over the communication channel and thereby change over the transmit/receive selector from its transmit mode to its receive mode.

System Operation

The manner in which the I/O serial multiplexer illustrated in the FIGURE operates now will be briefly described. Although not shown, a suitable power supply is provided to apply operating power to remote module 10 and to local module 12. This very same power supply may be used to energize the P.L.C. When power first is applied to the system, controllers 36 and 66 are initialized to establish the condition wherein transmit/receive selector 34 connects two-wire asynchronous communication channel 14 to its receive terminal R and transmit/receive selector 64 connects the communication channel to its transmit terminal T. The controlling program for the P.L.C. applies a control byte to the input ports of input interface circuit 50; and this control byte is serialized by parallel-to-serial converter 70, applied to transmit/receive selector 64 and transmitted to remote module 10 over the two-wire asynchronous communication channel. When this control byte has been transmitted, controller 66 is provided with a suitable indication thereof to change over transmit/receive selector 64 to its receive mode. Local module 12 now awaits receipt of information transmitted back from remote module 10.

At the remote module, the serialized control byte is applied to serial-to-parallel converter 40 whereat it is converted to parallel form and supplied to output interface circuit 20. Here, the individual control bits included in the control byte received from local module 12 are coupled to the remote devices connected to the output ports. Thus, bit #1 is transmitted to device #1, bit #2 is transmitted to device #2, and so on. It is recognized that output interface circuit 20 formats the serially received control bits to supply respective bits to corresponding output devices.

After the serialized control bit has been received by remote module 10, controller 36 is provided with a suitable indication thereof to change over transmit/receive selector 34 to its transmit mode, thereby enabling the remote module to transmit status information to the local module. Status bits received from input devices coupled to the input ports of input interface circuits 16 and 18 are formatted by the input interface circuits into status bytes. For example, the status byte produced by input interface circuit 16 includes status bit #1 derived from the device coupled to input port #1, status bit #2 derived from the device coupled to input port #2, and so on. Likewise, the status byte produced by input interface circuit 18 is comprised of status bit #1 derived from the device coupled to input port #1 of this interface circuit, status bit #2 derived from the device coupled to input port #2, and so on. The status byte produced by input interface circuit 16 is coupled to storage device 22 which, under the control of read/write circuit 26, writes this status byte into an appropriate storage location. Similarly, the status byte produced by input interface circuit 18 is written into storage device 24. It will be recognized that controller 36 conditions read/write circuit 26 to operate in its write mode now that remote module 10 is disposed in its status information transmit condition.

Let it be assumed that one status byte is stored in storage device 22 and another is stored in storage device 24. Controller 36 now conditions read/write circuit 26 to operate in its read mode and also conditions storage selector 28 to couple storage device 22 to parallel-to-serial converter 30. Under the control of read/write circuit 26, the status byte stored in storage device 22 is read to the parallel-to-serial converter whereat it is serialized and transmitted to two-wire asynchronous communication channel 14 via transmit/receive selector 34. After this status byte is read from storage device 22, controller 36 changes over storage selector 28 to couple storage device 24 to parallel-to-serial converter 30. The read/write circuit 26 now reads the status byte from storage device 24; and this status byte is serialized and transmitted over the communication channel. In the embodiment described herein, after this second status byte is transmitted to local module 12, a suitable indication of that transmission is supplied to controller 36 which now conditions transmit/receive selector 34 to its receive mode and changes over storage selector 28 to couple storage device 22 to parallel-to-serial converter 30 for future operation. Also, read/write circuit 26 now is disposed in its write mode so as to write the next status bytes produced by input interface circuits 16 and 18 to storage devices 22 and 24, respectively.

Local module 12 now receives the serialized status bits transmitted from remote module 10; and the first serialized status byte is supplied by transmit/receive selector 64 to serial-to-parallel converter 60. Controller 66 conditions interface selector 58 to couple output interface circuit 46 to the serial-to-parallel converter. Accordingly, the status byte (which now is in parallel form) is supplied from serial-to-parallel converter 60 to output interface circuit 46 whereat the status byte is coupled from the output ports of this interface circuit to the P.L.C.

A suitable indication is supplied to controller 66 indicating that the first status byte has been received and supplied to output interface circuit 46. As a result, controller 66 changes over interface selector 58 to couple output interface circuit 48 to serial-to-parallel converter 60. Accordingly, upon receipt of the next serialized status byte from two-wire asynchronous communication channel 14, serial-to-parallel converter 60 supplies this next status byte, in parallel form, to output interface circuit 48. This second status byte is transferred from the output ports of output interface circuit 48 to the P.L.C. Upon receipt of this second status byte, controller 66 conditions transmit/receive selector 64 to its transmit mode and changes over interface selector 58 to couple output interface circuit 46 to serial-to-parallel converter 60 for future operation.

The P.L.C. now is supplied with two status bytes representing status information of the remote devices coupled to the input interface circuits of remote module 10. The P.L.C process the status information to produce a control byte whose individual bits are used to adjust various operating parameters controlled by the remote devices coupled to output interface circuit 20 of remote module 10. As a result of this interactive operation between status information derived from remote devices coupled to the remote module, the processing of that status information by the P.L.C. coupled to the local module, and the return to the remote module of control information, various process-related parameters may be sensed and controlled from a central station without requiring complicated electrical interconnections between that station and the devices being controlled.

The foregoing has described one complete cycle of operation of the illustrated apparatus. After status information is received by the local module from the remote module, the P.L.C. transmits control information to the remote module, thus initiating yet another cycle of data communication.

In a preferred embodiment, controllers 36 and 66 each are implemented by a Model 8797BH microcontroller manufactured by Intel Corporation of Santa Clara, Calif., having an internal clock on the order of 12

MHz to enable the illustrated serial I/O multiplexer to operate at a data communication speed of 9600 baud.

Because of the constraint presented by the operating speed of communication channel 14, the input interface circuits provided in remote module 10 operate to transfer a status byte to storage devices 22 and 24 at a transfer rate on the order of about 3-4 milliseconds. Likewise, serial-to-parallel converter 40 operates to transfer a status byte to output interface circuit 20 on the order of about 1 byte every 3-4 milliseconds.

While the present invention has been particularly shown and described with reference to a preferred embodiment, various changes and modifications may be made without departing from the spirit and scope of the invention. For example, and as mentioned above, a greater number of input and output interface circuits may be provided at remote module 10. To accommodate a greater number of input interface circuits, a larger number of storage locations may be used to store temporarily the status bytes derived from the remote devices or sensors from which status information is produced. As mentioned previously, the storage devices may be implemented in the form of a RAM; and read/write circuit 26 may include an address generator to select the appropriate read and write addresses therefor. In addition, one or more analog channels may be provided in addition to the digital input and output ports of remote module 10. Each analog channel may include an analog/digital converter to convert input analog information into digital form for transmission to local module 12. Likewise, an output analog channel may be coupled to an output port, including a digital-/analog converter to convert digital control information received from the P.L.C. into analog form for application to the remote device coupled to that channel. Still further, suitable indicators, such as visual indicators, for example, LED's, may be provided at each input and output port of remote module 10 as well as of local module 12 to provide ready indication of any fault in the system. Likewise, an LED may be provided at one or both of transmit/receive selectors 34 and 64 for the same purpose. Hence, troubleshooting may be facilitated.

It is intended that the appended claims be interpreted as covering the embodiment disclosed herein, the changes mentioned above, and all equivalents thereto.

What is claimed is:

1. Serial input/output multiplexing apparatus for bidirectional communication between remote devices and a controller over a two-wire, asynchronous communication channel, comprising:

a remote module including remote input interface means for receiving input status signals from each of plural input devices coupled thereto, remote output interface means for transmitting output control signals to each of plural output devices coupled thereto, and control means for selectively coupling the remote input interface means or the remote output interface means to said two-wire, asynchronous communication channel for supplying serial input status information to said communication channel in response to said input status signals or for supplying to the remote output interface means output control information serially received from said communication channel; and a local module including local output interface means for applying said input status information to said controller, local input interface means for receiving from said controller output control information to be coupled to said remote module, and control means for selectively coupling the local output interface means or the local input interface means to said two-wire, asynchronous communication channel for applying to said controller said input status information serially received by the local output interface means from said communication channel or for serially supplying said output control information from the local input interface means to said communication channel in response to output control information received by the local input interface means from said controller.

2. The apparatus of claim 1 wherein the remote module control means includes selector means for coupling said remote input interface means or said remote output interface means to said communication channel, and sense means for sensing status and control signals transmitted and received, respectively, by said remote module; the local module control means includes selector means for coupling said local input interface means or said local output interface means to said communication channel, and sense means for sensing control and status signals transmitted and received, respectively, by said local module; and said remote module selector means couples said remote output interface means to said communication channel until a control signal is received whereafter said remote module selector means couples said remote input interface means to said communication channel to transmit status signals, and said local module selector means couples said local input interface means to said communication channel for transmitting a control signal thereover whereafter said local module selector means couples said local output interface means to said communication channel to receive status signals.

3. Serial input/output multiplexing apparatus for bidirectional communication between remote devices and a controller over a two-wire, asynchronous communication channel, comprising:

a remote module including remote input interface means for receiving input status signals from each of plural input devices coupled thereto, remote output interface means for transmitting output control signals to each of plural output devices coupled thereto, parallel-to-serial converting means for receiving input status bits in parallel from said input devices and converting the parallel input status bits to serial form for transmission over said communication channel and control means for selectively coupling the parallel-to-serial converting means or the remote output interface means to said two-wire, asynchronous communication channel for supplying serial input status bits to said communication channel or for supplying to the remote output interface means output control information serially received from said communication channel; and a local module including local output interface means for applying input status information to said controller, local input interface means for receiving from said controller output control information to be coupled to said remote module, and control means for selectively coupling the local output interface means or the local input interface means to said two-wire, asynchronous communication channel for applying to said controller input status information derived from the status bits received by the local output interface means from said communication channel or for serially supplying said output control information from the local input interface means to said communication channel in response to output control information received by the local input interface means from said controller.

4. The apparatus of claim 3 wherein the remote input interface means further includes plural input ports coupled to respective ones of said input devices for receiving status bits from said input devices, such that said remote input interface means formats status bits received from plural input devices into an input status byte, whereby each input status byte is comprised of status bits derived from said plural input devices.

5. The apparatus of claim 4 wherein said remote module further includes storage means for storing each input status byte formatted by said remote input interface mans and supplying said input status byte to said parallel-to-serial converting means.

6. The apparatus of claim 5 wherein said storage means comprises plural storage devices for storing plural status bytes formatted by said remote input interface means, and read means for reading individual status bytes from said storage devices in succession to said parallel-to-serial converting means.

7. Serial input/output multiplexing apparatus for bi-directional communication between remote devices and a controller over a two-wire, asynchronous communication channel, comprising:
a remote module including remote input interface means for receiving input status signals from each of plural input devices coupled thereto, remote output interface means for transmitting output control signals to each of plural output devices coupled thereto, serial-to-parallel converting means for receiving output control bits in serial form from said communication channel and converting the control bits from serial form to parallel form for transmission to said plural output devices and control means for selectively coupling the remote input interface means or the serial-to-parallel converting means to said two-wire, asynchronous communication channel for supplying serial input status information to said communication channel in response to said input status signals or for supplying to the serial-to-parallel converting means output control bits serially received from said communication channel; and
a local module including local output interface means for applying said input status information to said controller, local input interface means for receiving from said controller output control information to be coupled to said remote module, and control means for selectively coupling the local output interface means or the local input interface means to said two-wire, asynchronous communication channel for applying to said controller said input status information serially received by the local output interface means from said communication channel or for serially supplying to said communication channel output control bits derived from the output control information received by the local input interface means from said controller.

8. The apparatus of claim 7 wherein the remote output interface means further includes plural output ports coupled to respective ones of said output devices for supplying the received control bits thereto, such that said remote output interface means formats the received control bits into an output control byte to supply the bits therein to respective output devices.

9. Serial input/output multiplexing apparatus for bi-directional communication between remote devices and a controller over a two-wire, asynchronous communication channel, comprising:
a remote module including remote input interface means for receiving input status signals from each of plural input devices coupled thereto, remote output interface means for transmitting output control signals to each of plural output devices coupled thereto, and control means for selectively coupling the remote input interface means or the remote output interface means to said two-wire, asynchronous communication channel for supplying serial input status information to said communication channel in response to said input status signals or for supplying to the remote output interface means output control information serially received from said communication channel; and
a local module including local output interface means for applying said input status information to said controller, local input interface means for receiving from said controller output control information to be coupled to said remote module, serial-to-parallel converting means for receiving input status bits in serial form from said communication channel and converting the status bits in serial form to status bytes for application to said local module output interface means and control means for selectively coupling the serial-to-parallel converting means or the local input interface means to said two-wire, asynchronous communication channel for applying to said controller said status bytes converted by the serial-to-parallel converting means from the input status bits received from said communication channel or for serially supplying said output control information from the local input interface means to said communication channel in response to output control information received by the local input interface means from said controller.

10. The apparatus of claim 9 wherein said local module serial-to-parallel converting means applies successive status bytes to said local module output interface means.

11. The apparatus of claim 10 wherein said local module output interface means comprises plural interface circuits; and said local module additionally includes selector means responsive to the local module control means for applying successive status bytes to respective ones of said interface circuits.

12. Serial input/output multiplexing apparatus for bi-directional communication between remote devices and a controller over a two-wire, asynchronous communication channel, comprising:
a remote module including remote input interface means for receiving input status signals from each of plural input devices coupled thereto, remote output interface means for transmitting output control signals to each of plural output devices coupled thereto, and control means for selectively coupling the remote input interface means or the remote output interface means to said two-wire, asynchronous communication channel for supplying serial input status information to said communication channel in response to said input status signals or for supplying to the remote output interface means output control information serially received from said communication channel; and a local module including local output interface means for applying said input status information to said controller, local input interface means for receiving from said controller output control information to be coupled to said remote module, parallel-to-serial converting means for receiving output control bytes from said local module input interface means and converting the received output control bytes to serial control bits for transmission over said communication channel and control means for selectively coupling the local output interface means or the parallel-to-serial converting means to said two-wire, asynchronous communication channel for applying to said controller said input status information serially received by the local output interface means from said communication channel or for serially supplying said serial control bits from the parallel-to-serial converting means to said communication channel in response to output control information received by the local input interface means from said controller.

13. Serial input/output multiplexing apparatus for bi-directional communication between remote devices and a P.L.C. over a two-wire, asynchronous communication channel, comprising:

a remote module including input interface means coupled to respective ones of said remote devices to receive status bits therefrom, output interface means coupled to respective ones of said remote devices for supplying control bits thereto, parallel-to-serial converting means for receiving status bytes from said remote input interface means and for converting the received status bytes to serial form, serial-to-parallel converting means for converting control bits received from said P.L.C. to parallel form and applying same to said remote output interface means, and selector means for coupling said parallel-to-serial converting means to said communication channel to supply status bits thereto in serial form and for coupling said serial-to-parallel converting means to said communication channel to receive serial control bits therefrom; and a local module including input interface means coupled to said P.L.C. to receive control bytes therefrom, output interface means coupled to said P.L.C. for supplying status bytes received from the remote module thereto, parallel-to-serial converting means for receiving said control bytes from said local input interface means and for converting said control bytes to serial control bits, serial-to-parallel converting means for converting status bits received from said communication channel in serial form to parallel form and applying the parallel status bits to said local output interface means, and selector means for coupling the local parallel-to-serial converting means to said communication channel to supply said serial control bits thereto from said parallel-to-serial converting means and for coupling the local serial-to-parallel converting means to said communication channel to receive serial status bits from said remote module.

14. The apparatus of claim 13 wherein the remote selector means includes remote control means for sensing receipt of control bits by the remote module from said communication channel to thereafter couple said remote parallel-to-serial converting means to said communication channel and for sensing transmission of status bits to said communication channel by the remote module to thereafter couple said remote serial-to-parallel converting means to said communication channel.

15. The apparatus of claim 14 wherein the local selector means includes local control means for sensing transmission of control bits by the local module to said communication channel by the local module to thereafter couple said local serial-to-parallel converting means to said communication channel and for sensing receipt of status bits from said communication channel to thereafter couple said local parallel-to-serial converting means to said communication channel.

16. The apparatus of claim 15 wherein said remote module includes storage means coupled to said input interface means for storing the status bits received from respective remote devices, said status bits being stored as status bytes, and read-out means for reading out status bytes in succession from said storage means to said remote parallel-to-serial converting means.

17. The apparatus of claim 16 wherein said local output interface means includes means for supplying successive status bytes received by said local serial-to-parallel converting means from the remote module to said P.L.C.

* * * * *